(12) United States Patent
Voute et al.

(10) Patent No.: US 8,522,601 B2
(45) Date of Patent: Sep. 3, 2013

(54) METHOD AND DEVICE FOR CHECKING THE INTEGRITY OF A FLEXIBLE, NONPOROUS BAG WITH ONE OR MORE BELLOWS

(75) Inventors: Nicolas Voute, Cuges les Pins (FR); Magnus Stering, Le Mesnil le Roi (FR); Martin Dahlberg, Goettingen (DE); Hartmut Langer, Goettingen (DE)

(73) Assignee: Sartorius Stedim Biotech S.A., Aubagne (FR)

( * ) Notice: Subject to any disclaimer, the term of this patent is extended or adjusted under 35 U.S.C. 154(b) by 471 days.

(21) Appl. No.: 12/864,927

(22) PCT Filed: Dec. 29, 2008

(86) PCT No.: PCT/FR2008/052428
§ 371 (c)(1),
(2), (4) Date: Jul. 28, 2010

(87) PCT Pub. No.: WO2009/095572
PCT Pub. Date: Aug. 6, 2009

(65) Prior Publication Data
US 2010/0326172 A1     Dec. 30, 2010

(30) Foreign Application Priority Data

Jan. 28, 2008   (FR) .................................. 08 00423

(51) Int. Cl.
*G01M 3/04* (2006.01)
(52) U.S. Cl.
USPC .......................................................... 73/40
(58) Field of Classification Search
USPC .......................................................... 73/40
See application file for complete search history.

(56) References Cited

U.S. PATENT DOCUMENTS 5,988,422 A    11/1999  Vallot
2006/0277975 A1  12/2006  Barcan

FOREIGN PATENT DOCUMENTS

FR   2 781 202       1/2000
WO   91/16611       10/1991

OTHER PUBLICATIONS

Anonymous: "ASTM F2095-07e1 Standard Test Methods for Pressure Decay Leak Test for Flexible Packages With and Without Restraining Plates", Book of Standards, vol. 15.10, 2007 XP008096350.
"Automated Package Tester BT-1000" [Online] Dec. 8, 2006, XP002495726, Retrieved from the Internet, URL:http://www.rycobel.de/download/prospekte/3-32%20Package%20Tester%20BT-1000.pdf> [retrieved on Sep. 11, 2008], alineas "Leak Testing" et "Options—Restraining plate fixtures".
International Search Report dated Jun. 29, 2009, from corresponding PCT application.

*Primary Examiner* — Hezron E Williams
*Assistant Examiner* — Rodney T Frank
(74) *Attorney, Agent, or Firm* — Young & Thompson

(57) ABSTRACT

There is a bag (1) that has at least one lateral gusset (4) and at least one port (8), a source (10) of pressurized gas, elements (11) for measuring the pressure of the gas; —there are two restraining plates and spacer strips. The bag is placed flat between the two restraining plates (2a, 2b). At least one spacer strip (15a, 15b) is inserted between the two small walls of each gusset in order to prevent these walls from resting on one another. The port is connected to the gas source and the pressure measuring elements. The gas is sent under pressure into the bag, the expansion of the bag being limited by the restraining plates; then, the pressure drop in the bag is compared to a predefined threshold.

18 Claims, 3 Drawing Sheets

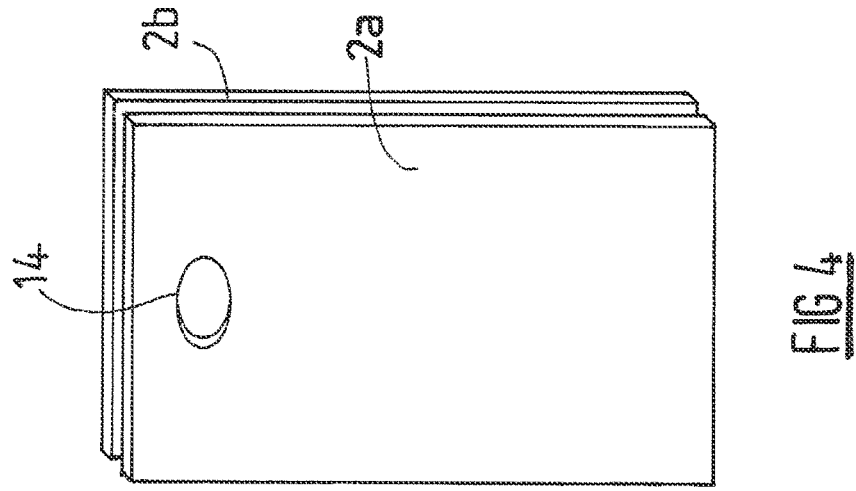
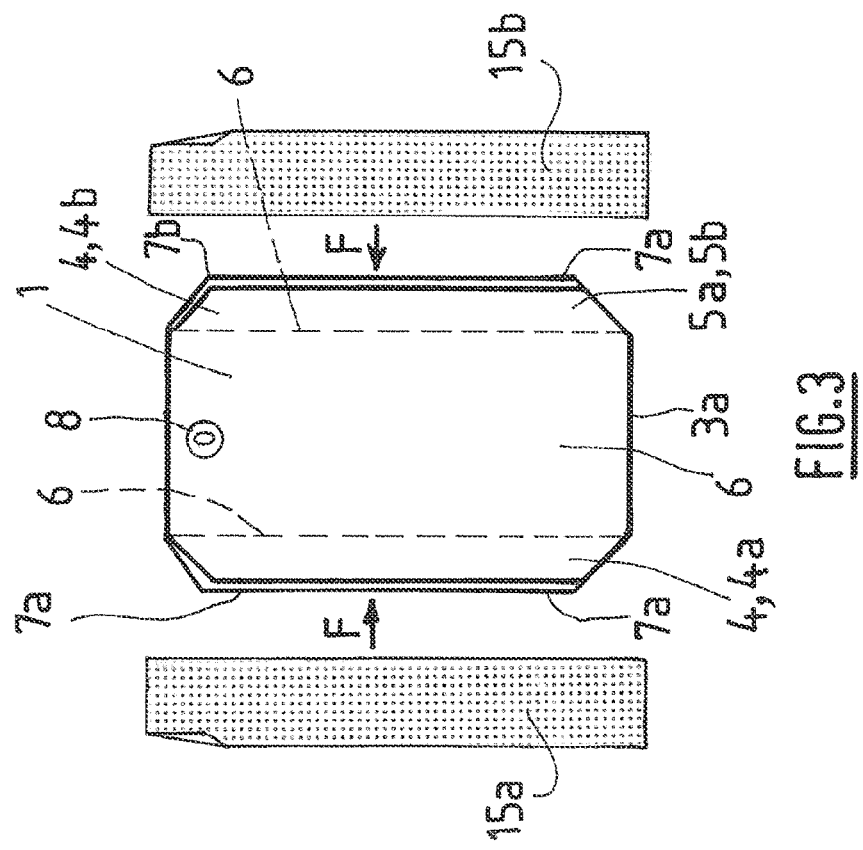

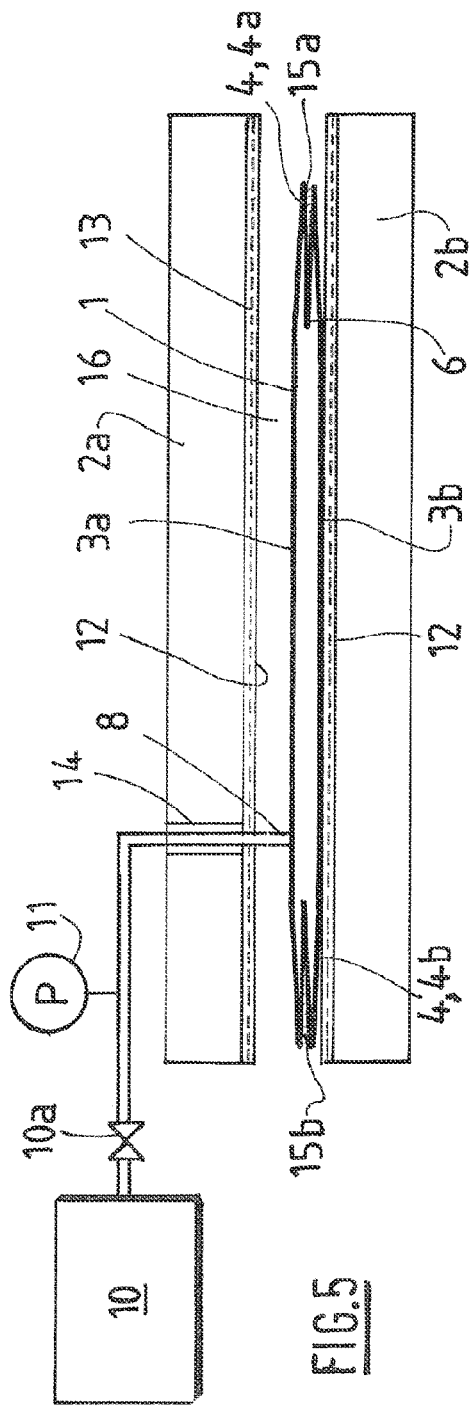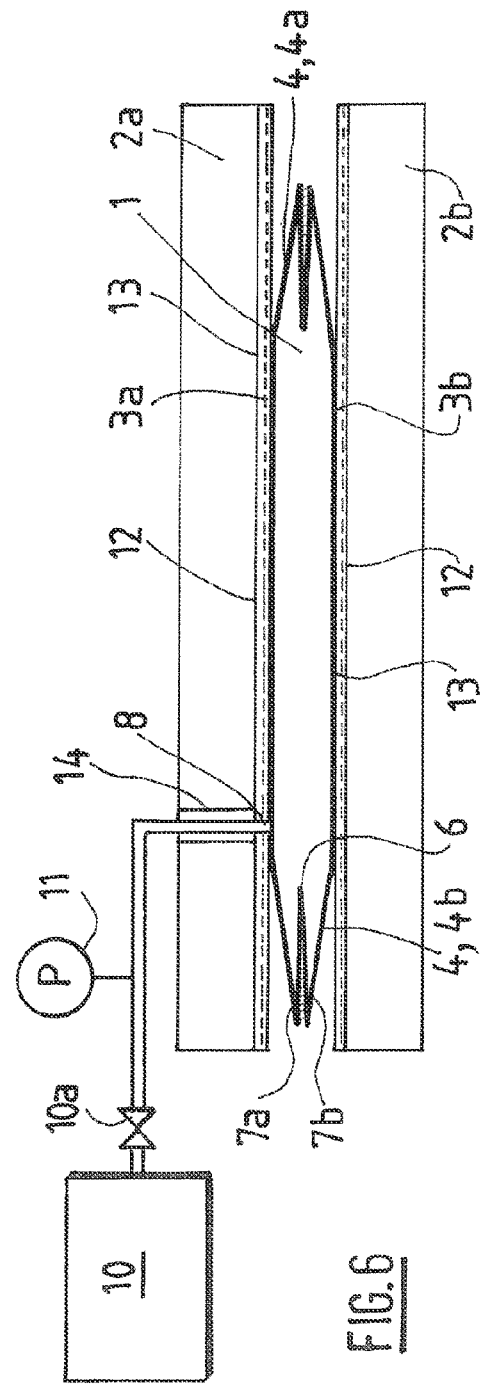

METHOD AND DEVICE FOR CHECKING THE INTEGRITY OF A FLEXIBLE, NONPOROUS BAG WITH ONE OR MORE BELLOWS

BACKGROUND OF THE INVENTION

1. Field of the Invention

The invention relates to a process for checking the integrity of a nonporous flexible bag with gusset(s) in order to detect the presence of leaks, and a device for checking integrity for the implementation of this process. The invention likewise relates to bags that have been checked by said process or by means of said device.

The invention is especially intended for disposable sterile bags for bio-pharmaceutical fluids. In this case, high value-added products could be placed in the bags, for which it is critical that it is certain that the bag be tight.

2. Description of the Related Art

Flexible and nonporous bags with two large walls directly joined to one another have been known for a long time. Of these bags, once unfolded, they remain relatively thin; this justifies their often being called "pillow" bags or "2D" bags (D indicating dimensions).

The document FR-A-2 781 202 describes a bag with two large walls and two lateral gussets. Each gusset comprises two small walls connected to one another by an internal fold, and each small wall is connected to the adjacent large wall by an external fold. Such a bag, once unfolded, assumes a three-dimensional shape (cylindrical, prismatic, parallelepipedic . . . ) and can have a volume of 50 liters, or even more; this justifies its being called a 3D bag.

In numerous technical fields and especially in the field of health, it is critical to ensure that fabricated, nonporous flexible bags are tight, i.e., at least have a degree of tightness considered satisfactory. This is even more important in the case in which the bag comprises, following its production, welding lines that can also comprise leak sources.

There are several processes for checking the integrity of such bags.

Standard F 2095-01 of ASTM International entitled "Standard Test Methods for Pressure Decay Leak Test for Nonporous Flexible Packages With and Without Restraining Plates" relates more accurately to the so-called pressure decay process.

This process is envisioned according to two possible embodiments: with restraining plates or without such plates.

In the embodiment with restraining plates, the process is as follows:

in a preparation phase:
  there is a bag to be checked with at least one port that can be blocked or connected in a tight and stationary manner;
  there is a source of pressurized gas intended to be introduced into the bag via the port,
  there are means for measuring the pressure of the gas in the bag via the port,
  there are two fixed restraining plates spaced apart and facing one another, able to not conceal a possible leak in the large walls of the bag placed against them,
  the bag is placed flat between the two restraining plates,
  at least one port of the bag is connected to the gas source and pressure measurement means so as to be able to send the gas under pressure into the bag and to measure the gas pressure in the bag, and, in a final test phase:
  the gas is sent under pressure into the bag, expansion of the bag being limited when its large walls move against the restraining plates,
  then, in a final stage, the pressure drop in the bag is compared by the pressure measurement means to a predefined pressure drop threshold of a bag considered tight.

If the pressure drop in the bag is less than the threshold, it is considered that the bag has passed the integrity test, whereas if the pressure drop in the bag exceeds the threshold, the bag is considered to not have passed the integrity test. Actually, in this case, the magnitude of the pressure drop is dictated by the presence of one or more leaks.

The embodiment with restraining plates has two advantages over the embodiment without such plates: limiting the volume of the pressurized bag, this increasing the sensitivity of the test, and increasing the internal pressure of the bag. This embodiment, moreover, makes it possible to test the integrity of the peripheral weld that connects the two walls of a 2D bag and the tightness of the port.

In this case, the restraining plates are spaced slightly apart.

Devices are known for implementing a checking process for filters and membranes by the pressure decay technique (but without restraining plates), for example the SARTOCHECK® 4 device from the SARTORIUS Company. Devices with plates are also available from other manufacturers.

In these devices, the restraining plates have the characteristic according to which, in full or in part, for their surface intended to be in contact with a large wall of the bag, they allow passage of pressurized gas originating from the bag if the latter has one or more leaks. For this purpose, and in one embodiment, the restraining plates comprise a porous or similar layer against which the large walls of the bag are placed.

This structural arrangement is critical. Actually, failing this, the plates would block any leakage source against which they would be applied; this would lead to what could be called a "blocked pore" effect. In this case, the pressure drop in the bag established during the check would be less than a predefined threshold, the pore forming the leak being plugged, and this constant could be interpreted as meaning that the bag has passed the integrity check, whereas it in fact has one (or more) leak(s).

The implementation of a tightness test without the restraining plates would make it possible to eliminate the risks of blockage of the pores. Nevertheless, this implementation would lead to continuous expansion of the flexible bag and ultimately to its failure.

The process and device for checking integrity with restraining plates is satisfactory in the case of the "pillow" or "2D" bags described above. Conversely, this process and this device cannot be used in the case of 3D bags because the small walls of the gussets will come to rest against one another due to the short distance between the restraining plates and due to the pressure in the bag. Use of restraining plates with large spacing is not desirable because it would lead to expansion and unfolding of the bag. It will then be necessary to re-fold this bag before its packaging that would adversely affect the speed and ease of implementation of the method.

Of course, implementing processes for checking the integrity of such bags other than the pressure decay process would be possible. This would be at the cost of the advantages of this process, however, specifically its promptness, its ease of implementation, and its capacity to be performed "on line."

The document US 2006/0277975 describes a test process in which a test material is applied to the bag to be tested, and at least one test is conducted on the layer of the material that has been applied to determine the integrity of the bag.

The tester BT-1000 from the Rycobelgroup Company tests integrity by the pressure decay method.

The document WO 91/16611 describes a bag tester, the bag to be tested being placed between two plates.

BRIEF SUMMARY OF THE INVENTION

Thus, the object of the invention is to remedy the aforementioned problems.

More exactly, the invention calls for being able to use, in the case of 3D bags with gusset(s), the process and device for checking integrity with restraining plates, preserving all of the advantages that they yield, while preventing—or finding a solution to—the "blocked pore" effect in the small walls of the gusset(s).

For this reason and according to a first aspect, the invention suggests a process for checking the integrity of a nonporous flexible bag with gusset(s) in order to detect the presence of leaks, in which:

in a preparation phase:
  there is a bag with two facing large walls, at least one lateral gusset with two facing small walls, and on one of the large walls at least one port that can be blocked or connected in a tight and stationary manner,
  there is a source of pressurized gas intended to be introduced into the bag via the port,
  there are means for measuring the pressure of the gas in the bag via the port,
  there are two fixed restraining plates spaced apart and facing one another, able to not conceal a possible leak in the large walls of the bag placed against them,
  there are one (or more) movable spacer strip(s), able, on the one hand, to be placed between the restraining plates and inserted into the (or each) gusset, and, on the other hand, once inserted, able to not block a possible leak in the small walls of a gusset placed against it,
  the bag is placed flat between two restraining plates,
  at least one spacer strip is inserted between the two small walls of the (or each) gusset in order to prevent these walls from resting on one another,
  at least one port of the bag is connected to the gas source and pressure measurement means so as to be able to send the gas under pressure into the bag and to measure the gas pressure in the bag, in a test phase:
  the gas is sent under pressure into the bag, expansion of the bag being limited when its large walls move against the restraining plates,
  then, in a final stage, the pressure drop in the bag is compared by the pressure measurement means to a predefined pressure drop threshold of a bag considered tight such that if the pressure drop in the bag is less than the threshold, the bag is considered to have passed the integrity check, whereas if the pressure drop in the bag exceeds a threshold, the bag is considered not to have passed the integrity check.

As will be seen, the restraining plates and spacer strips under consideration allow passage of the pressurized gas optionally originating from the flexible bag in the case of a leak. For this purpose, the surfaces of these plates and strips in contact with the bag are porous or nonsmooth, such as having a functionally granular or similar appearance.

According to one embodiment, there is (are) one (or more) spacer strip(s) that can be moved between a retracted position in which it (they) does (do) not interfere with the bag and an inserted position in which it (they) occupies (occupy) the entire interior of the (or each) gusset, there is a strip (or strips) in the spaced position for placement of the bag to be checked, and there is a strip (or strips) in the inserted position for the checking phase.

According to one embodiment, the spacer strip is moved out of the retracted position into the inserted position or vice versa, by sliding.

According to one embodiment:
  there is a bag with two essentially similar lateral gussets, spaced apart and facing one another, pointed toward the interior of the bag, each gusset comprising two small walls connected to one another by an inner fold and each small wall being connected to the adjacent large wall by an outer fold,
  there are two restraining plates located essentially parallel to one another,
  there are two (or a series of two) spacer strips able to be placed between the two restraining plates and inserted into the two gussets.

According to one embodiment, in this case, two (or a series of two) spacer strips are inserted into the two gussets so as to be essentially coplanar, spaced apart from one another in their common plane, and arranged essentially parallel to the restraining plates.

According to one embodiment, there are two restraining plates with a small space between each other, kept this way such that in the absence of a spacer strip inserted into the (or each) gusset, the small walls of the gusset would at least partially rest against one another, the bag being pressurized.

According to one variant:
  there is a bag with a gusset comprising several component gussets side by side,
  and there is (are) one (or more) movable spacer strip(s) able to be placed in each of the component gussets.

According to a second aspect, the invention suggests a device for checking the integrity of a nonporous flexible bag with gusset(s) in order to detect the presence of leaks, designed for implementation of the process just described, characterized in that it comprises:

a source of pressurized gas intended to be introduced into the bag via the port and connection means,
    means for measuring the pressure of the gas in the bag via the port and connection means,
  two fixed restraining plates spaced apart and facing one another, able to not conceal a possible leak in the large walls of the bag placed against them,
    one (or more) spacer strip(s) that can be moved between a retracted position and an inserted position, able on the one hand to be placed between the restraining plates and inserted into the (or each) gusset of the bag to be checked, and, on the other hand, once inserted, to not block a possible leak in the small walls of a gusset placed against it,
    means for moving the spacer strip(s) out of their retracted position into their inserted position,
    and means for comparison of the pressure drop in the bag by pressure measurement means to a predefined threshold.

According to one embodiment, means for moving the strip(s) out of their retracted position into their inserted position are or comprise means of movement by translation or sliding.

According to one embodiment, the device comprises the following:
  two restraining plates, located essentially parallel to one another, and two (or two series of) spacer strips able to be placed between the two restraining plates and inserted into the two gussets.

According to one embodiment, in the inserted position, the two (or two series of) spacer strips are essentially coplanar, spaced apart from one another in their common plane, and arranged essentially parallel to the restraining plates.

According to one embodiment, the restraining plates have a small distance between one another such that in the absence of the spacer strip inserted into the (or each) gusset, the small walls of the gusset would rest at least partially against one another, the bag being pressurized.

According to one embodiment, the device comprises one (or more) movable spacer strip(s), able to be placed in each of the component gussets of a bag with a gusset comprising several component gussets side by side.

As has been stated, it is critical that the restraining plates and spacer strips allow the passage of pressurized gas possibly originating from the flexible bag in case of a leak. For this purpose, the surfaces of these plates and strips in contact with the bag are porous and or nonsmooth, such as having a functionally granular or similar appearance.

BRIEF DESCRIPTION OF THE DRAWINGS

Several embodiments of the invention are now described using drawings in which:

FIG. 3 is an elevation view of the 3D bag with two gussets from FIG. 1 with the spacer strips of the checking device in the retracted position, before being moved into the position inserted into the gussets, FIG. 4 is a perspective view of the two fixed restraining plates of the checking device, showing the short distance between the plates, FIG. 5 is a transversal cutaway view of the checking device with two fixed restraining plates, in which there is a 3D bag to be checked, into the two gussets of which two spacer strips have been inserted, the figure corresponding to the situation at the end of the preparation phase and prior to the test phase, FIG. 6 is a transversal cutaway view similar to FIG. 5, corresponding to the situation during the test phase.

DETAILED DESCRIPTION OF THE PREFERRED EMBODIMENTS

Figure 1:
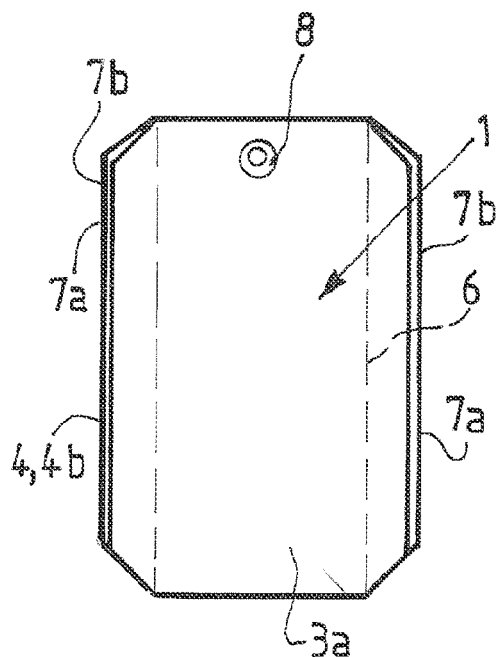
FIG. 1 is an elevation view of a 3D bag with two gussets of the type whose integrity must be checked, the bag here being flat, the gussets being folded toward the interior of the bag.
Figure 2:
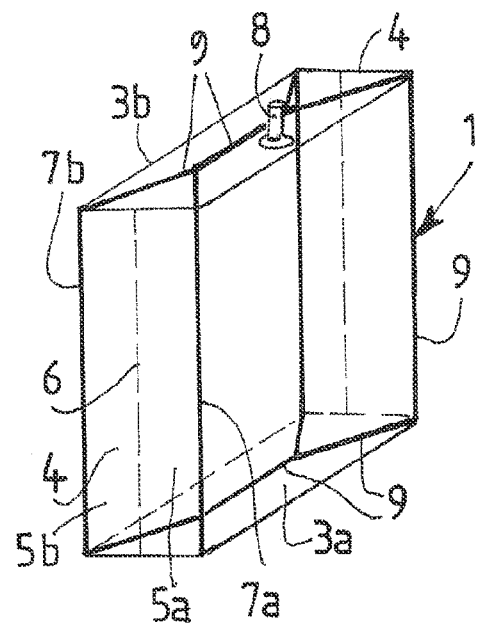
FIG. 2 is a perspective view of the 3D bag with two gussets from FIG. 1, the bag being expanded here and the gussets unfolded.
Figure 7:
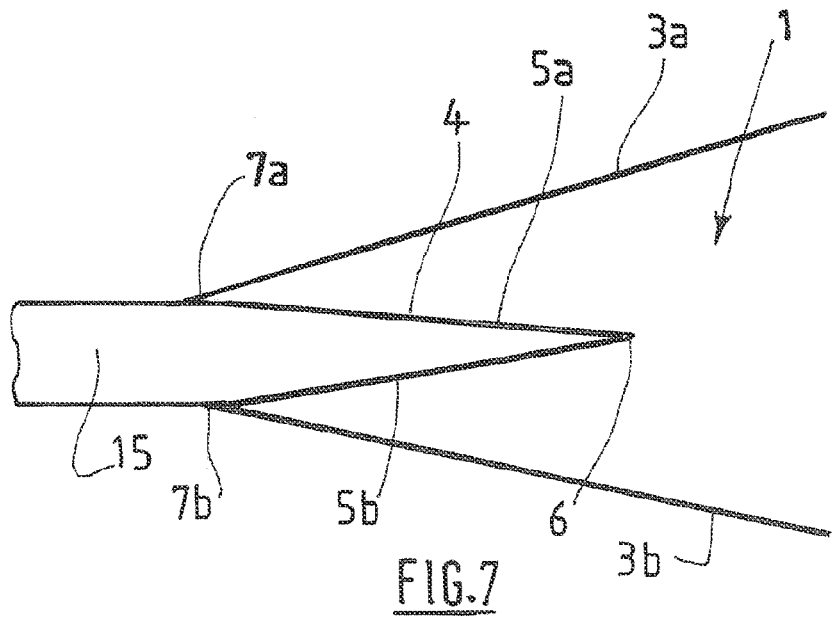
FIG. 7 is a partial view, on a larger scale, of FIG. 6, showing a spacer strip inserted into a gusset.

In the invention, the process and device for checking the integrity of a nonporous flexible bag 1 in order to detect the presence of leaks are of the pressure decay type, with fixed restraining plates 2a, 2b.

The principles of this technique are described in the standard F 2095-01 of ASTM International entitled "Standard Test Methods for Pressure Decay Leak Test for Nonporous Flexible Packages With and Without Restraining Plates." This standard is familiar to one skilled in the art. It is intended both for the case of checking with fixed restraining plates and the case of checking without such plates. It is understood that the invention relates only to the case of checking with fixed restraining plates, referenced as 2a, 2b in this instance.

The integrity checking process and device of the invention are designed especially for a nonporous flexible bag 1, of the type with two large facing walls 3a, 3b, and at least one lateral gusset 4 with two small facing walls 5a, 5b.

In the embodiment shown in the drawings that will be the object of the following description, the bag 1 has two essentially analogous lateral gussets 4a, 4b, spaced apart and facing one another, pointed toward the interior of the bag.

Each gusset 4 comprises two small walls 5a, 5b, connected to one another by an inner fold 6, whereas each small wall 5a, 5b is connected to the adjacent large wall 3a, 3b respectively by an outer fold 7a, 7b.

On one of the large walls, in this instance wall 5a, there is at least one port 8 that can be blocked or connected in a tight and stationary manner.

Such a bag, moreover, comprises a certain number of welding lines 9 originating from production.

The general characteristics of such a bag with gussets are described in, for example, the document FR-A-2 781 202, within the scope of one skilled in the art.

The large walls 3a, 3b of such a bag 1 of general rectangular shape with split corners have a length and width that depend on the desired volume for the bag 1. In typical embodiments, this length is between 500 and 5,000 mm, and this width is between 300 and 1,200 mm.

The width of the small walls 5a, 5b of the gussets 4a, 4b—that corresponds to the depth of the gussets—likewise depends on the volume that is desired for the bag 1. In typical embodiments, this width or depth is between 50 and 600 mm.

With such dimensions, it is possible to have a bag 1 whose volume exceeds 50 l and reaches 3,000 l; this justifies the bag 1 being qualified as a "large-size" bag.

Of course, the invention applies equally to the case of bags of smaller size, since they comprise one or more gussets.

Moreover, it is understood that the invention also applies to the variant embodiment in which a gusset 4 is not composed of a single pair of small walls 5a, 5b, but is composed of a plurality of pairs of small walls such as 5a, 5b, each pair of small walls 5a, 5b comprising a component gusset, the gusset 4 then comprising several similar component gussets side by side. In this case, it is enough to transpose what is stated for the gusset 4 to each component gusset.

The device comprises a source 10 of pressurized gas. This gas is designed to be introduced into the bag 1 via the port 8 and suitable connection means. Such connection means are known and within the scope of one skilled in the art.

The device likewise comprises means 11 for measuring the pressure of the gas in the bag 1 via the port 8 and connection means.

The device likewise comprises a valve such as 10a, connected to the source 10 for communicating with the bag 1 or not.

Fundamentally, the same port 8 is used for connection to the gas source 10 and the pressure measurement means 11. However, the use of two separate ports cannot be precluded.

The device likewise comprises the two aforementioned rigid, fixed restraining plates 2a, 2b. These plates 2a, 2b are spaced apart facing one another, in this instance located essentially parallel to one another.

The restraining plates 2a, 2b are characterized essentially by being able to not block a possible leak in the large walls 3a, 3b of the bag 1 placed against them.

In one embodiment, the restraining plates 2a, 2b are, in full or only in part, for their surface 12 intended to be in contact with one wall 3a, 3b of the bag 1, arranged to allow passage of pressurized gas that can originate from the interior of the bag 1 if there is a leak.

For example, in one embodiment, the restraining plates 2a, 2b comprise—on the side of their surfaces 12—a lining 13 that is porous to the gas. In another embodiment, the plates 2a, 2b are not smooth and have a similar grainy appearance from the functional standpoint.

It is understood that the restraining plates 2a, 2b must have a rigidity that allows the pressure applied by the bag 1 to be withstood once it has been inflated. Of course, there is a support structure of the restraining plates 2a, 2b.

In the inventive device, the two restraining plates 2a, 2b have a small space between them, although the process and the device are implemented with 3D bags that can be of large size, as indicated above.

Small spacing is defined as spacing of the same order of magnitude as that currently existing in the application to 2D bags. In other words, this spacing would be such that, all other things being equal, the small walls 5a, 5b of the gusset 4 would rest at least partially against one another when the bag 1 is pressurized, as will be seen.

For example, the spacing between the two restraining plates 2a, 2b can be roughly ten millimeters.

One of the restraining plates, for example the plate 2a, comprises a through passage 14, located on the plate 2a at a suitable location such that the port 8 on the large wall 5a can be located facing the passage 14. This arrangement makes it possible to access the port 8 even when the bag 1 is placed between the two restraining plates 2a, 2b.

Whatever the case, there are reference points facilitating the correct positioning of the bags 1 on the two restraining plates 2a, 2b.

The device likewise includes two spacer strips 15a, 15b in this instance.

These spacer strips 15a, 15b are arranged to be able to move between a retracted position and an inserted position to which they will return.

For this purpose, the device comprises means for moving the two spacer strips 15a, 15b out of their retracted position into their inserted position, and vice versa.

In one embodiment, the means for moving the two spacer strips 15a, 15b out of their retracted position into their inserted position are or comprise means of movement in translation or in sliding.

It is understood, however, that other forms of movement can be envisioned.

In one possible embodiment, in place of two one-piece spacer strips 15a, 15b, there are two series of strips end to end, forming continuity.

The spacer strips 15a, 15b are arranged to be able firstly to be placed in the space 16 that exists between the restraining plates 2a, 2b.

They can also be inserted into the two gussets 4a, 4b of the bag 1 to be checked. "Inserted" means that the strips are occupying the entire space of the gusset 4a, 4b or at least covering all of the small walls 5a, 5b comprising the gusset 4a, 4b. For this purpose and as the case may be, the spacer strips 15a, 15b in cross-section have a very closed V shape, comprising a distal part coming to rest against the inner fold 6.

Considering the aforementioned small spacing between the two restraining plates 2a, 2b, the spacer strips 15a, 15b are relatively thin and even very thin.

Of course, the strips 15a, 15b must have a certain rigidity. However, the question of their rigidity does not arise in the same terms as for the restraining plates 2a, 2b. Actually, the same spacer strip 15a, 15b is designed to withstand the opposing pressures exerted from either side by the opposing walls 5a, 5b. For this reason, the slimness of the spacer strips 15a, 15b is not prohibitive.

The spacer strips 15a, 15b are arranged to be able secondly, and once inserted into the two gussets, not to block a possible leak in the small walls 5a, 5b that have been placed against one another, this characteristic being essential.

For this purpose, and following the example of the restraining plates 2a, 2b, the spacer strips 15a, 15b comprise on their two surfaces a lining that is porous to the gas, or they are comprised completely of a porous material. In another embodiment, the strips 15a, 15b are not smooth and have a similar or grainy appearance from the functional standpoint.

The device likewise comprises means for comparison of the pressure drop in the bag 1 once it has been inflated, measured using pressure measurement means 11, to a predefined threshold, as will be explained below.

In the inserted position, the two spacer strips 15a, 15b are essentially coplanar, spaced apart from one another in their common plane, and arranged essentially parallel to the restraining plates 2a, 2b.

In the variant in which a gusset 4 is composed of several component gussets side by side, there is a spacer strip (or a series of spacer strips) in each of the component gussets.

The process for implementing the device for checking the bag 1 that has just been described comprises a preparation phase followed by a test phase.

In the preparation phase, there is a bag 1 such as has been described and a checking device such as has been described.

Then, the bag 1 is placed flat, the gussets 4 being closed on themselves, between the two restraining plates 2a, 2b. On the other hand, a spacer strip 15a, 15b (arrows F, FIG. 3) is inserted between the two small walls 5a, 5b of each gusset 4, which strips are designed to prevent these walls 5a, 5b from coming to rest on one another due to the pressure that will be applied in the bag 1.

The sequence in which these operations have been carried out can comprise the object of different embodiments, in the same way as relating to the movement of the spacer strips 15a, 15b out of their retracted position into the inserted position, as explained above.

As follows from the description above, two spacer strips 15a, 15b are inserted into the two gussets 4a, 4b so as to be essentially coplanar, spaced apart from one another in their common plane, and arranged essentially parallel to the restraining plates 2a, 2b in the space 16.

The port 8 of the bag 1 is connected to the gas source 10 and pressure measurement means 11; this is enabled by the port facing the passage 14.

Due to this connection, it will then be possible to be able to send the pressurized gas into the bag 1 and to measure the pressure of the gas in the bag 1.

In the test phase, the pressurized gas is sent from the source 10 into the bag 1. The expansion of the bag 1 is limited, its large walls 3a, 3b making contact with the restraining plates 2a, 2b, more exactly, the linings 13.

As is recognized, it is generally necessary to wait for the end of a stabilization period before proceeding to the test itself.

Then, in a final stage, the pressure drop in the bag is compared to a predefined pressure drop threshold using pressure measurement means.

This threshold is the value of the pressure drop of a bag that is undergoing checking and that is considered tight.

The test results can then be interpreted:
if the pressure drop in the bag 1 is less than the threshold, it is considered that the bag 1 has passed the integrity check,
if, on the contrary, the pressure drop in the bag 1 exceeds the threshold, it is considered that the bag 1 has not passed the integrity check.

In the embodiment in which there is a bag with a gusset comprising several component gussets side by side, the spacer strips are inserted into each of the component gussets.

The invention claimed is:

1. A process of checking the integrity of a nonporous flexible bag with one or more gussets to detect leaks, the process comprising:
in a preparation phase of the integrity checking:
providing a bag with two facing large walls, and at least one lateral gusset with two facing small walls, at least one port on one of the large walls configured to be blocked or connected in a tight and stationary manner,
providing a source of pressurized gas to be introduced into the bag via the port, providing means for measuring the pressure of the gas in the bag via the port,
providing two fixed restraining plates spaced apart and facing one another, the fixed restraining plates being disposed such that the fixed restraining plates are not able to conceal a leak in the large walls of the bag placed against the restraining plates,
providing one or more movable spacer strips configured to be placed between the restraining plates and inserted into the one or more gussets, and, after being inserted into the one or more gussets, being disposed to not block a leak in the small walls of one of the gussets placed against the one or more movable spacer strips,
positioning the bag flat between two of the restraining plates,
inserting at least one spacer strip between the two small walls of the one or more gussets in order to prevent the small walls from resting on one another, and
connecting at least one port of the bag to the gas source and the pressure measurement means so as to be able to transmit the gas under pressure into the bag and to measure the gas pressure in the bag;
in a testing phase of the integrity checking, transmitting the gas under pressure into the bag, expansion of the bag being limited when the large walls move against the restraining plates; and
in a final stage of the integrity checking, comparing a pressure drop in the bag, using the pressure measurement means, to a predefined pressure drop threshold of another bag that is tight such that when the pressure drop in the bag is less than the predefined pressure drop threshold, the bag is indicated to have passed the integrity check, and when the pressure drop in the bag exceeds the threshold, the bag is indicated to not have passed the integrity check.

2. The process according to claim 1, wherein the one or more spacer strips configured to be moved between a retracted position in which the one or more spacer strips do not interfere with the bag and an inserted position in which the one or more spacer strips occupy an entire interior of the one or more gussets, at least one of the spacer strips being in the retracted position for placement of the bag to be checked, at least one of the spacer strips being in the inserted position for a checking phase.

3. The process according to claim 2, wherein the at least one of the spacer strips is moved from the retracted position to the inserted position, or from the retracted position to the inserted position, by sliding.

4. The process according to claim 1, wherein:
the bag is provided with two essentially similar lateral gussets, the two essentially similar lateral gussets being spaced apart and facing one another, and pointed toward an interior of the bag, each of the lateral gussets comprising the two small walls connected to one another by an inner fold, each of the small walls being connected to an adjacent one of the large walls by an outer fold,
the two restraining plates are located essentially parallel to one another, and the one or more spacer strips includes two spacer strips or two series of spacer strips positioned between the two restraining plates and inserted into the two gussets.

5. The process according to claim 4, wherein the two spacer strips or the two series of spacer strips are inserted into the two gussets so as to be essentially coplanar, spaced apart from one another in a common plane, and arranged essentially parallel to the restraining plates.

6. The process according to claim 1, wherein the restraining plates have a small space between each other such that in the absence of one of the spacer strips inserted into the one or more gussets, the small walls of the one or more gussets would at least partially rest against one another, the bag being pressurized.

7. The process according to claim 1, wherein
the bag comprises a plurality of component gussets side-by-side,
the process further comprising positioning one or more of the movable spacer strips in each of the component gussets.

8. A device for checking the integrity of a nonporous flexible bag with one or more gussets to detect a presence of leaks, configured to implement the process according to claim 1, the device comprising:
the source of pressurized gas configured to be introduced into the bag via the port and the connection means;
the means for measuring the pressure of the gas in the bag via the port and the connection means;
the two fixed restraining plates spaced apart and facing one another, the fixed restraining plates being disposed such that the fixed restraining plates are not able to conceal a leak in the large walls of the bag placed against the restraining plates;
the one or more spacer strips configured to be moved between a retracted position and an inserted position, and configured to be placed between the restraining plates and inserted into the one or more gussets of the bag to be checked, and, after being inserted into the one or more gussets, being disposed to not block a leak in the small walls of one of the gussets placed against the one or more spacer strips;
means for moving the one or more spacer strips out of the retracted position and into the inserted position; and
means for comparison of the pressure drop in the bag, using pressure measurement means, to a predefined threshold.

9. The device according to claim 8, wherein the means for moving the one or more spacer strips out of the retracted position into the inserted position comprise sliding movement means.

10. The device according to claim 8, wherein:
two of the restraining plates are located essentially parallel to one another, and two of the spacer strips or a series of two of the spacer strips are configured to be placed between the two restraining plates and inserted into the two of the gussets.

11. The device according to claim 10, wherein, in the inserted position, the two spacer strips or the two series of spacer strips are essentially coplanar, spaced apart from one another in a common plane, and disposed essentially parallel to the restraining plates.

12. The device according to claim 8, wherein the restraining plates have a small space between each other such that in the absence of one of the spacer strips inserted into the one or more gussets, the small walls of the one or more gussets would at least partially rest against one another, the bag being pressurized.

13. The device according to claim 8, wherein the device comprises the one or more movable spacer strips configured to be placed in each of a plurality of component gussets of the bag with the one or more gussets comprising several of the component gussets side-by-side.

14. The device according to claim 8, wherein one or more of the restraining plates and the one or more spacer strips that, in whole or in part, through a surface thereof intended to be in contact with one wall of the bag, allows passage of the pressurized gas, the one or more of the restraining plates and the spacer strips having one or more properties including a porosity to the gas, not being smooth, and having a similar or grainy appearance.

15. The device according to claim 9, wherein:
two of the restraining plates are located essentially parallel to one another, and
two of the spacer strips or a series of two of the spacer strips configured to be placed between the two restraining plates and inserted into the two of the gussets.

16. The device according to claim 9, wherein the restraining plates have a small space between each other such that in the absence of one of the spacer strips inserted into the one or more gussets, the small walls of the one or more gussets would at least partially rest against one another, the bag being pressurized.

17. The device according to claim 9, wherein the device comprises the one or more movable spacer strips configured to be placed in each of a plurality of component gussets of the bag with the one or more gussets comprising several of the component gussets side-by-side.

18. The device according to claim 9, wherein one or more of the restraining plates and the one or more spacer strips that, in whole or in part, through a surface thereof intended to be in contact with one wall of the bag, allows passage of the pressurized gas, the one or more of the restraining plates and the spacer strips having one or more properties including a porosity to the gas, not being smooth, and having a similar or grainy appearance.

* * * * *